(12) United States Patent
Crossen

(10) Patent No.: US 6,513,283 B1
(45) Date of Patent: Feb. 4, 2003

(54) WEIGHT FOR RODENT BAIT STATIONS

(76) Inventor: Clinton D. Crossen, 106 Dalewood St., Hodges, SC (US) 29653

( * ) Notice: Subject to any disclaimer, the term of this patent is extended or adjusted under 35 U.S.C. 154(b) by 0 days.

(21) Appl. No.: 09/711,519

(22) Filed: Nov. 14, 2000

Related U.S. Application Data

(60) Provisional application No. 60/173,291, filed on Dec. 28, 1999.

(51) Int. Cl.7 .............................................. A01M 25/00
(52) U.S. Cl. ....................................................... 43/131
(58) Field of Search ................... 43/131, 100; 248/910; D10/83

(56) References Cited

U.S. PATENT DOCUMENTS

| | | | |
|---|---|---|---|
| 2,683,326 A | | 7/1954 | Gardner et al. |
| 4,453,337 A | | 6/1984 | Williams |
| 4,486,973 A | * | 12/1984 | Faucillon ..................... 43/100 |
| D357,969 S | | 5/1995 | Brickey |
| 5,446,992 A | | 9/1995 | Stewart |
| 5,713,694 A | * | 2/1998 | Monda et al. ................. 404/9 |
| 5,760,751 A | * | 6/1998 | Gipson ....................... 343/880 |
| 5,878,518 A | * | 3/1999 | Grewe ......................... 40/606 |
| 6,095,482 A | * | 8/2000 | LaGrotta et al. ............ 248/672 |

* cited by examiner

Primary Examiner—Kurt Rowan
(74) Attorney, Agent, or Firm—Richard C. Litman

(57) ABSTRACT

A rodent bait station weight that securely anchors a bait station in place thereby preventing the bait station from accidentally being tipped over and spilling its toxic contents. The weight is made of recycled rubber and weighs approximately 8 lbs. The weight is contoured to fit the shape of the bait station thereby ensuring a uniform distribution of the anchoring weight. The weight is tough, durable, and weather resistant.

14 Claims, 5 Drawing Sheets

WEIGHT FOR RODENT BAIT STATIONS

CROSS-REFERENCE TO RELATED APPLICATION

This application claims the benefit of U.S. Provisional Patent Application Ser. No. 60/173,291, filed Dec. 28, 1999.

BACKGROUND OF THE INVENTION

1. Field of the Invention

The present invention relates to rodent bait stations and, more particularly, to specially configured weights for securing rodent bait stations. The rodent bait station weight prevents the accidental and incidental moving or tipping over of a bait station.

2. Description of Related Art

The pest control industry plays an important role in maintaining the health and safety of the community. Rodents such as mice and rats have long been known to be carriers of disease. Their efficient extermination significantly improves the physical and psychological well-being of a community.

A common method of vermin extermination involves the use of bait stations that contain a poisonous bait. However, a primary concern when using bait stations is that a bait station may be inadvertently tipped over or moved. If a bait station is accidentally tipped over, then the poisonous contents of the bait station are released and any unsuspecting pet or even a small child could come in contact with the poisonous bait with detrimental consequences. If the bait station is accidentally moved, the bait station could be less accessible to the rodents and therefore, less effective in eradicating the pest. Therefore, it would be extremely advantageous to have the bait station securely anchored in place thereby eliminating the possibility of accidental tipovers or inadvertent displacement.

The prior art describes a variety of rodent bait stations. For example, U.S. Pat. No. Des. 357,969 issued on May 2, 1995 to J. L. Brickey describes an ornamental design for a combined bait holder and weight. An exterminating device is described in U.S. Pat. No. 2,683,326 issued on Jul. 13, 1954 to C. N. Gardner et al. The exterminating device has a rectangular housing with an opening for a rodent to enter the device. A holder in the device contains poisonous bait for the rodent to consume.

U.S. Pat. No. 4,453,337 issued on Jun. 12, 1984 to C. G. D. Williams describes a rodent feeding station. The feeding station has a generally rectangular housing that forms an enclosure containing a separate bait cup which cooperates with the walls of the enclosure to form an inexpensive disposable product. The housing has a pair of initially covered holes which permit a rodent to enter the housing and travel to an opening offset from the holes which provide access to the bait cup. A vermin bait station is described in U.S. Pat. No. 5,446,992 issued on Sep. 5, 1995 to R. J. Stewart. The bait station includes an outer housing and an inner housing slidably movable with respect to the outer housing. The inner housing is movable between open, closed, and extended positions.

None of the above inventions and patents, taken either singly or in combination, is seen to describe the instant invention as claimed.

SUMMARY OF THE INVENTION

The invention is a tough, durable rodent bait station weight to anchor a bait station firmly in place and thereby preventing the tipping over of the bait station and the spilling of the bait station's toxic contents. The weights of the present invention are configured to conform to the contour of the bait station thereby ensuring the proper distribution of the anchoring weight. The portion of the weight that is directly coupled to the bait station is denser than the remaining portion of the weight. This increased hardness at the point of attachment ensures a strong connection. A pair of parallel ridges on the weight elevate the bait station above the weight, and serve to function as a moisture release to remove excess moisture from the bait station thereby preventing bait station corrosion.

Accordingly, it is a principal object of the invention to provide a rodent bait station weight to anchor a bait station firmly in place.

It is another object of the invention to provide a rodent bait station weight that is easy to attach and remove.

It is a further object of the invention to provide a rodent bait station weight that is weather resistant.

Still another object of the invention is to provide a rodent bait station weight that prevents moisture from building up and corroding a bait station.

It is an object of the invention to provide improved elements and arrangements thereof in a rodent bait station weight for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
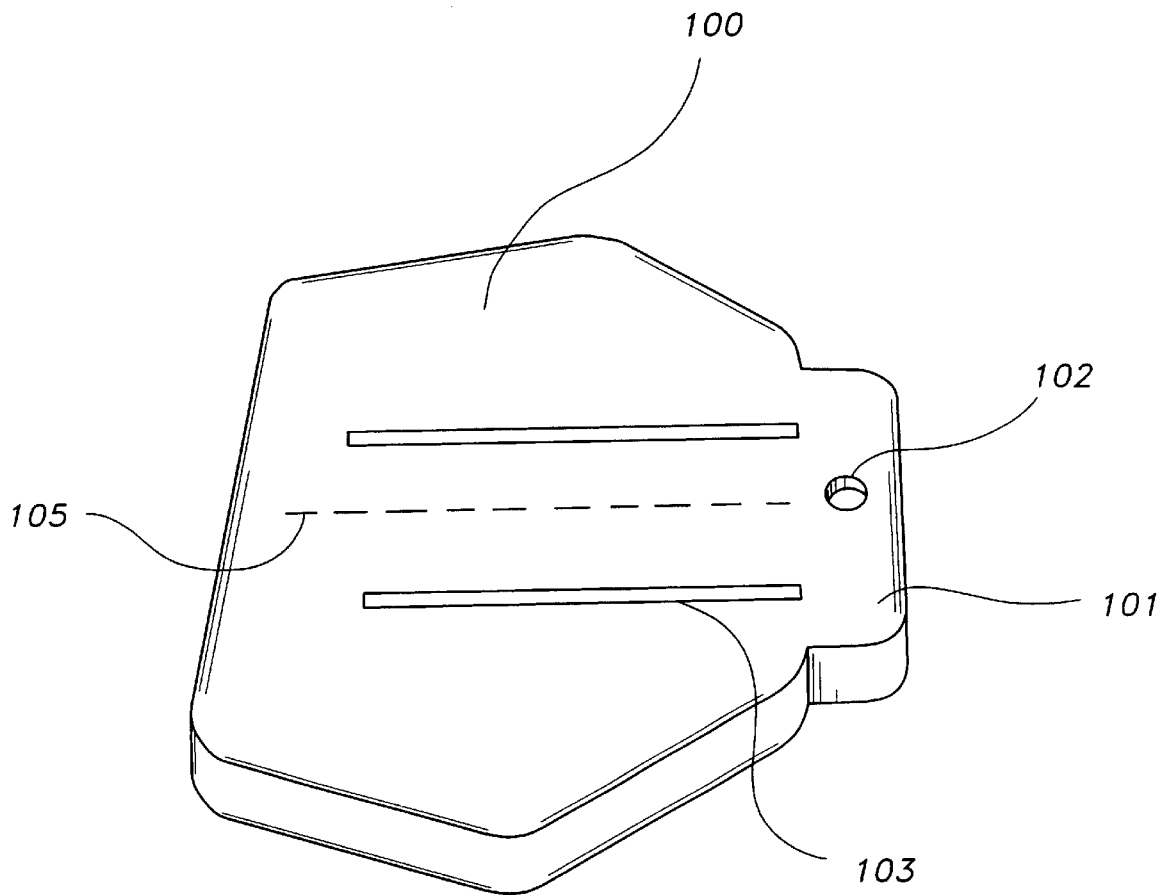
FIG. 1 is a perspective view of a configured weight used to secure a rodent bait station according to the present invention.

The present invention, as depicted in FIGS. 1–5, is a configured weight 100, 120 that is sized and dimensioned to secure a rodent bait station 104, 128 thereby preventing the bait station 104, 128 from tipping over and spilling its toxic contents. FIG. 1 shows a perspective view of a preferred embodiment of the contoured weight or anchor 100 of the present invention. The preferred embodiment depicted in FIG. 1 is specially designed to accommodate a PROTECTA LP bait station 104 produced by Bell Laboratories. However, this specific design can accommodate bait stations produced by other manufacturers. The distinctive contoured configuration of the weight 100 is shown in FIG. 1. The weight 100 is made from recycled rubber and weighs approximately 7 lbs. The weight 100 has a maximum length of 9¾ inches, a maximum width of 14⅛ inches, and a thickness of 1⅛ inches. The top edge of the weight is rounded back approximately ¼ of an inch. The anterior portion 101 of the weight 100 is a 1×4 inch solid rubber section with a hole 102 that extends through the weight 100. The increased density of the anterior portion 101 ensures a strong and sturdy mechanical bond with the bait station (see FIG. 2) when the weight 100 and the bait station 104 are bolted together.

In this embodiment, the shape of the weight 100 is a modified pentagon. The hole 102 is centered and disposed approximately 2 inches from the front of the weight 100. Two parallel elevations or ridges 103 that are 4 inches long and 4 inches apart are disposed about the midline 105 of the weight 100. These ridges 103 are 3/16 of an inch high and function as moisture releases between the bait station 104 and the weight 100.

Figure 2:
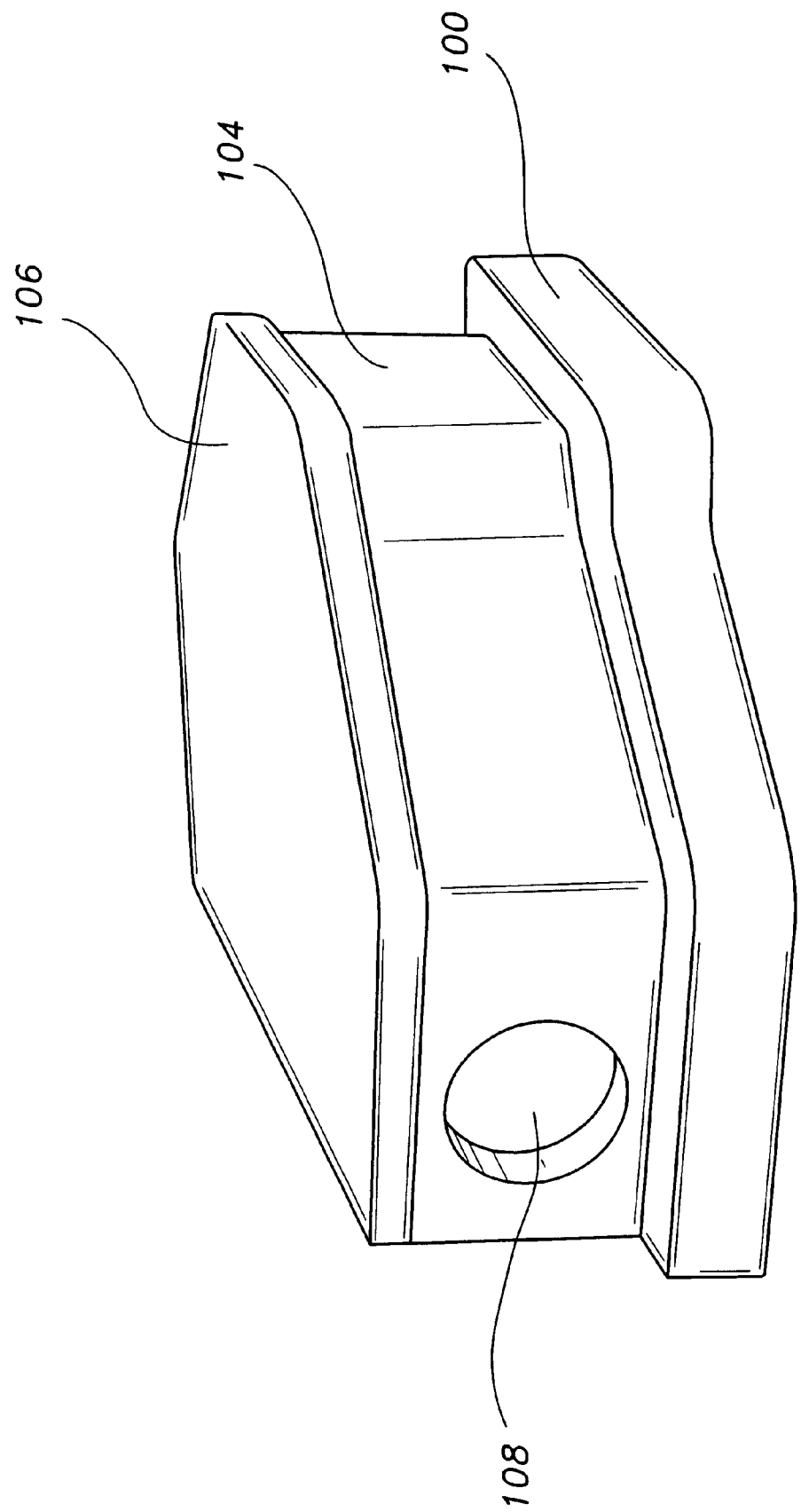
FIG. 2 is an environmental, perspective of a configured weight anchored to a rodent bait station.

FIG. 2 is an environmental, perspective of a configured weight 100 anchored to a PROTECTA LP bait station 104. A rodent (not shown) enters the bait station 104 through a laterally disposed opening 108 in the bait station 104. The contoured weight 100 holds the bait station 104 firmly in place despite the repeated and continuous activity of the rodents so that a large number of rodents can successfully consume the poisonous bait inside the bait station and die.

Figure 3:
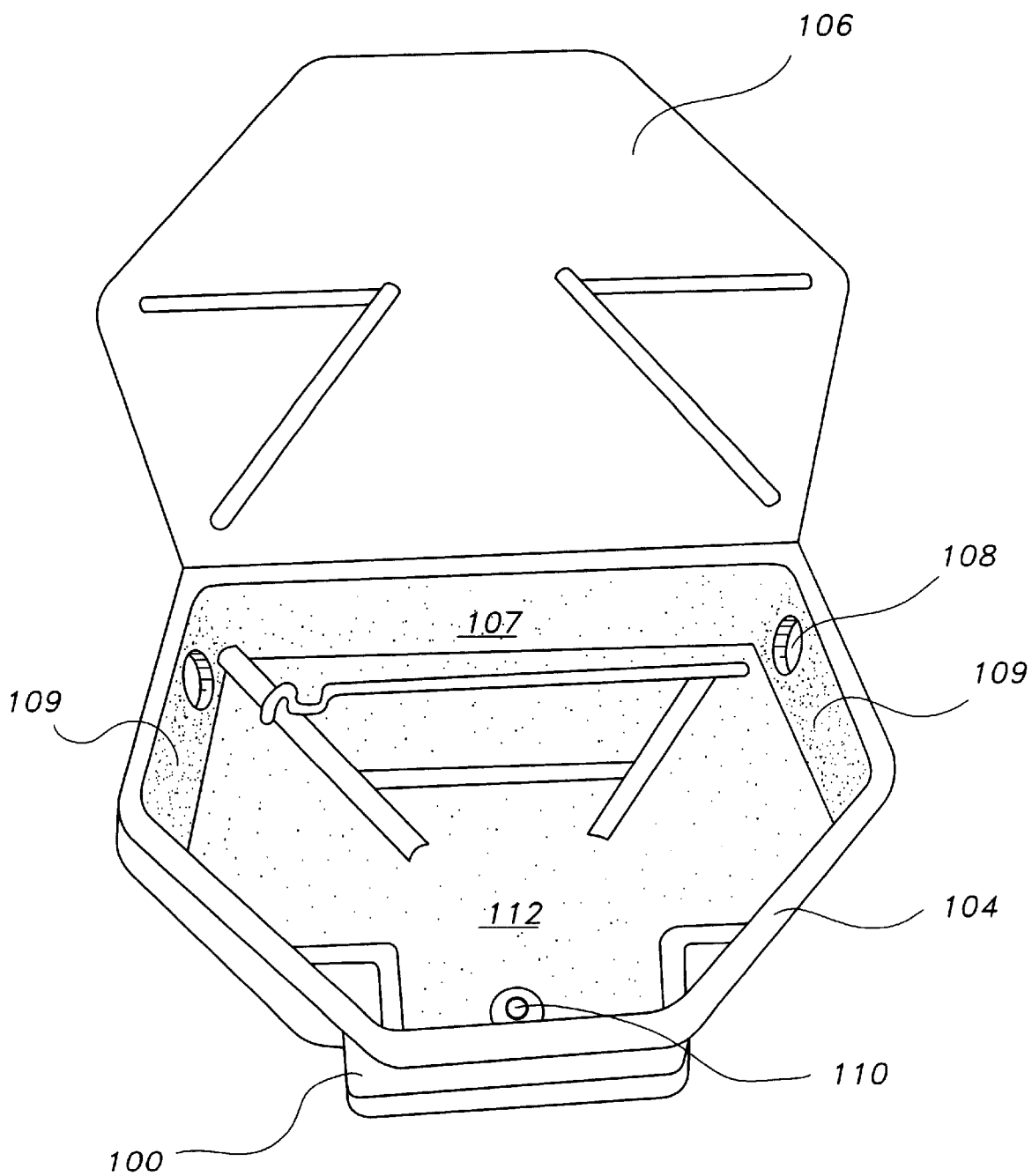
FIG. 3 is top perspective view of an anchored rodent bait station with the lid of the bait station up showing the location of the connecting bolt that secures the bait station to the underlying weight.

FIG. 3 is a top view of an anchored rodent bait station 104 with the lid 106 of the bait station 104 showing the location of the connecting bolt 110 that secures the bait station 104 to the underlying weight 100. As is seen the bait station 104 has a base 112, a back wall 107, surrounding side walls 109, and a lid 106 hingedly connected to back wall 107. The lid may be opened as shown for replenishing poison bait and then securely closed for deployment in a rodent-infested location, the rodents being free to enter and exit laterally disposed holes 108.

Figure 4:
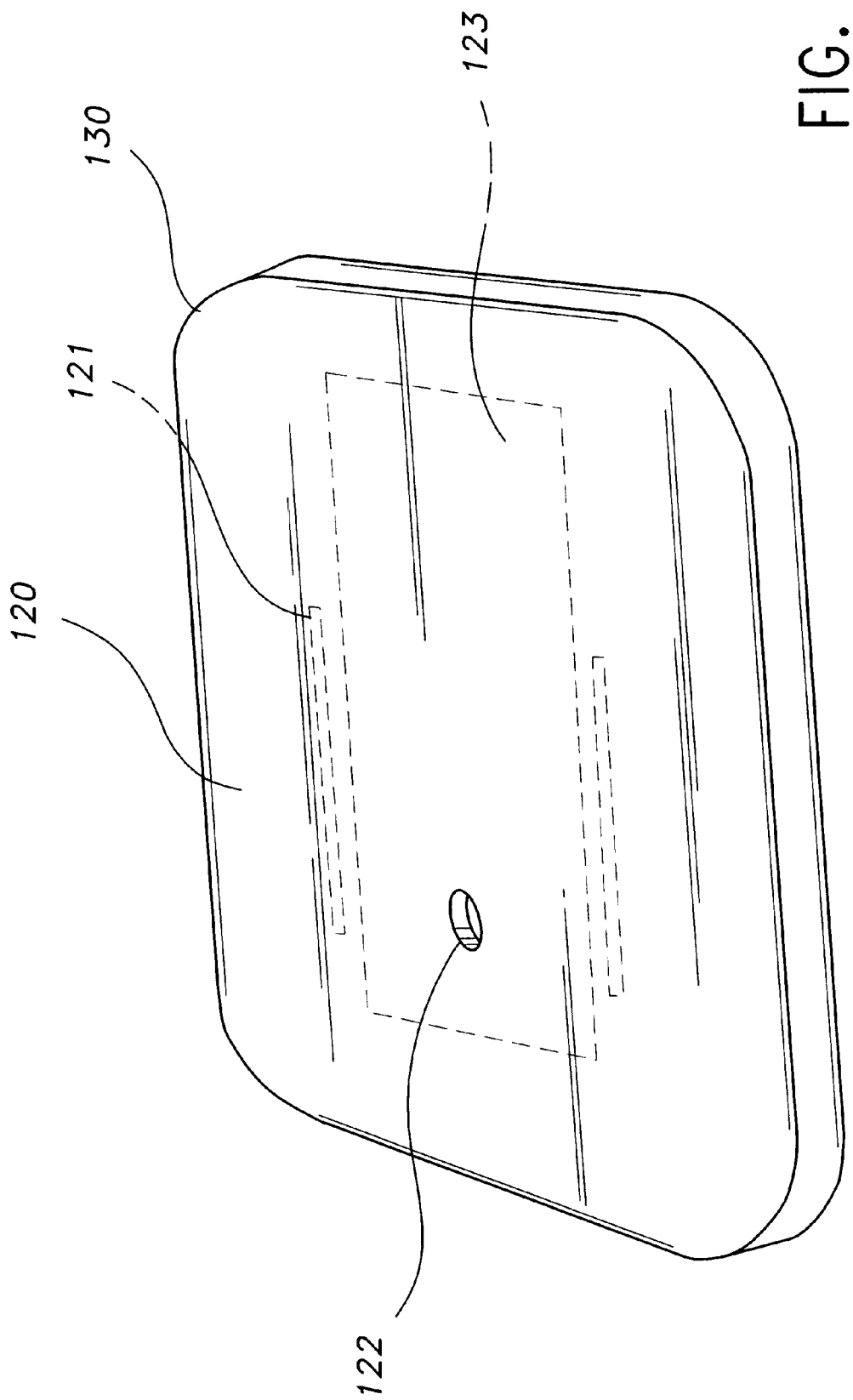
FIG. 4 is a perspective view of an alternate embodiment of the configured weight.

FIG. 4 is a perspective view of an alternate embodiment of the rodent bait station weight 120. The weight 120 of the alternate embodiment is specially designed to accommodate the PROTECTA bait station 128 produced by Bell laboratories. However, this specific design can accommodate bait stations produced by other manufacturers. The weight 120 is made from recycled rubber and weighs approximately 8 lbs. The weight 120 is 11⅝ inches in length, 11⅝ inches in width, and has a thickness of 1⅛ inches. The square shaped weight 120 has rounded corners 130 with the top edge rounded back ¼ of an inch. The weight 120 has a 3¾ inches×8⅝ inches center section 123 that is harder/more dense than the periphery of the weight 120. This centrally disposed solid section 123 is the portion of the weight 120 where the bait station 128 is anchored to the weight 120 using a ¼ inch bolt(not shown) and nut (not shown) once the hole 122 of the weight 120 and the hole 126 bait station 128 are aligned. The solid section 123 centralizes the weight distribution of the weight 120 which vastly improves the anchoring characteristics of the weight 120. A pair of parallel ridges 121 that are 4 inches long, 4 inches apart, and 3/16 of an inch in height run parallel to the solid section 123. In this embodiment, the weight 120 has a square shape. The parallel ridges 121 serve as a moisture release between the bait station 128 and the weight 120.

Figure 5:
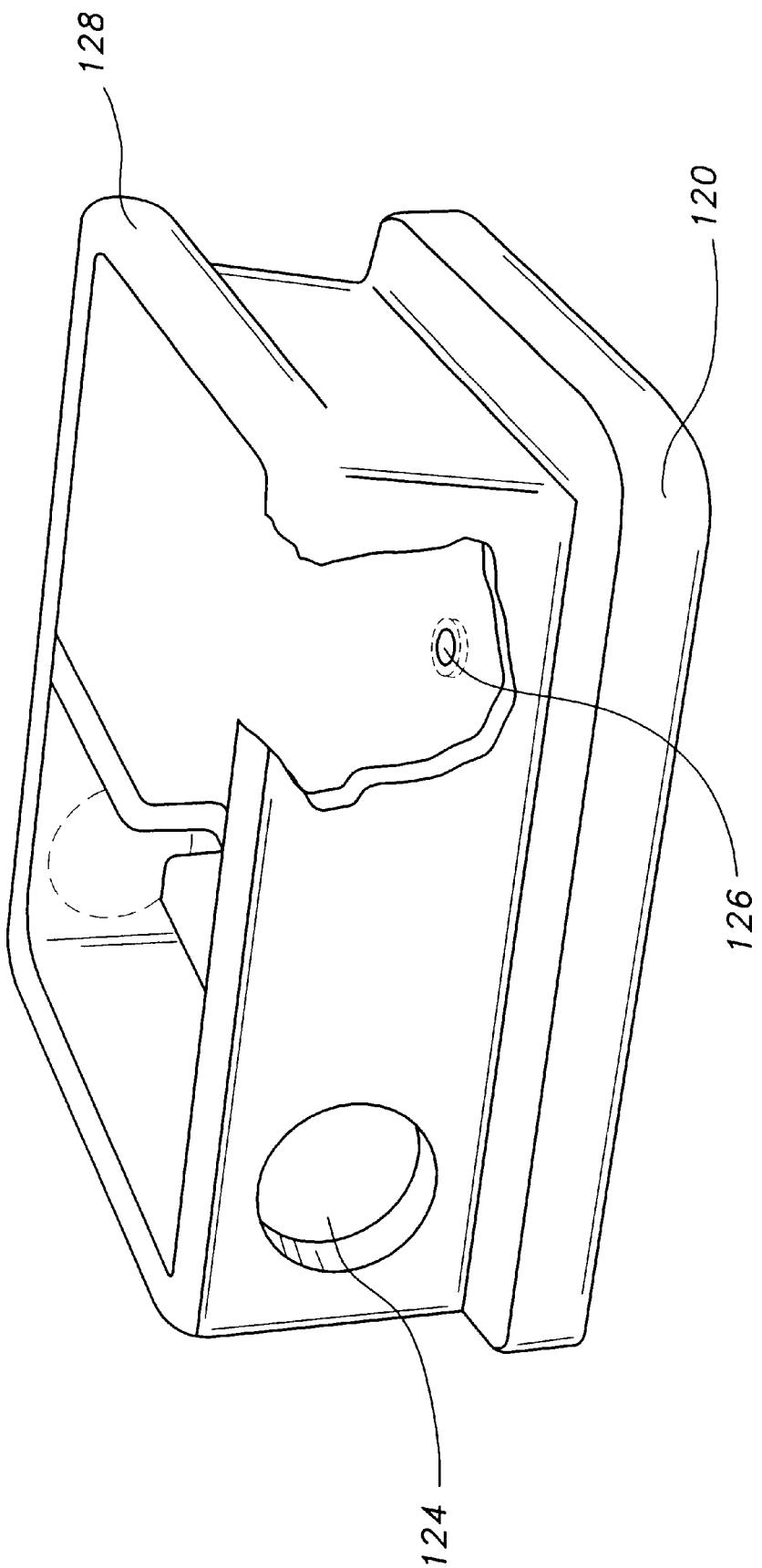
FIG. 5 is an environmental, perspective view of a rodent bait station anchored to the configured weight of the alternate embodiment.

FIG. 5 is an environmental, perspective view of a PROTECTA bait station 128 with its lid removed. The bait station 128 is shown anchored to the configured weight 120 of the alternate embodiment. A cutaway view reveals the opening 126 of the bait station 128 into which a connecting bolt (see FIG. 3) is inserted. The lateral opening 124 is where rodents enter and exit the bait station 128.

The rodent bait station weight of the present invention prevents the accidental tipping over of a bait station, for example, by the wind and the rodent bait station weight is economical to manufacture.

The preferred embodiments of the present invention disclosed herein are intended to be illustrative only and are not intended to limit the scope of the invention. It should be understood by those skilled in the art that various modifications and adaptations of the present invention as well as alternative embodiments of the present invention may be contemplated. It is to be understood that the present invention is not limited to the sole embodiments described above, but encompasses any and all embodiments within the scope of the following claims.

I claim:

1. An anchoring weight in combination with a rodent bait station, said combination comprising:
    a generally rectangular rodent bait station including:
        a base having an anterior section defining a hole therethrough;
        a back wall;
        surrounding side walls defining at least one opening for entry and exit of rodents; and
        a lid hingedly connected to said back wall; and
    a generally planar rectangular weight dimensioned to support said rodent bait station, said weight including:
        an upper surface; and
        an anterior end portion defining a hole therethrough corresponding in position with the hole in the base of said rodent bait station; and
    means for securing said weight to said rodent bait station;
    whereby said weight maintains said rodent bait station in a stable position to resist lateral movement and overturning by outside forces.

2. The combination bait station and weight of claim 1, wherein said weight defines a midline therein bisecting and normal to said anterior end portion, said hole in said weight being located along said midline.

3. The combination bait station and weight of claim 2, further comprising a plurality of ridges disposed along the upper surface of said weight for allowing moisture to be removed from between said rodent bait station and said weight.

4. The combination bait station and weight of claim 3, wherein there are two parallel ridges disposed about said midline of said weight.

5. The combination bait station and weight of claim 1, wherein said securing means is a bolt fastened through the hole in the base of said bait station and the corresponding hole in said weight.

6. The combination bait station and weight of claim 1, wherein said weight is contoured to conform to the configuration of said bait station.

7. The combination bait station and weight of claim 6, wherein said weight is made of recycled rubber having a density in said anterior end portion greater than that of the remainder of said weight.

8. The combination bait station and weight of claim 6, wherein said bait station is a PROTECTA LP bait station and said weight is in the shape of a modified pentagon and is contoured to conform to and accommodate a PROTECTA LP bait station.

9. The combination bait station and weight of claim 4, wherein said weight is made of recycled rubber having a density in a central portion of said weight greater than that in the remainder of said weight, and the hole in said weight is located in said central portion of said weight, said hole in said bait station base being located in a position corresponding to the hole in said central portion of said weight.

10. The combination bait station and weight of claim 1, wherein said bait station is a PROTECTA bait station and said weight is contoured to conform to and accommodate said PROTECTA bait station.

11. The combination bait station and weight of claim 1, wherein said securing means is a bolt fastened through the hole in the base of said bait station and the corresponding hole in said weight.

12. The combination bait station and weight of claim 11, wherein said weight is about 1⅛ inches in thickness.

13. The combination bait station and weight of claim 12, wherein said weight has a length of about 9¾ inches and a width of about 14⅛ inches and is configured to support a PROTECTA LP bait station.

14. The combination bait station and weight of claim 12, wherein said weight has a length and width of about 11⅝ inches and is configured to support a PROTECTA bait station.

* * * * *